(12) United States Patent
Chen et al.

(10) Patent No.: US 9,184,428 B2
(45) Date of Patent: Nov. 10, 2015

(54) NON-AQUEOUS ELECTROLYTES FOR LITHIUM ION BATTERIES

(75) Inventors: Zonghai Chen, Downers Grove, IL (US); Khalil Amine, Downers Grove, IL (US)

(73) Assignee: UCHICAGO ARGONNE LLC, Chicago, IL (US)

( * ) Notice: Subject to any disclaimer, the term of this patent is extended or adjusted under 35 U.S.C. 154(b) by 2267 days.

(21) Appl. No.: 11/373,054

(22) Filed: Mar. 10, 2006

(65) Prior Publication Data

US 2006/0210883 A1  Sep. 21, 2006

Related U.S. Application Data

(60) Provisional application No. 60/662,056, filed on Mar. 15, 2005.

(51) Int. Cl.

| | |
|---|---|
| *H01M 2/16* | (2006.01) |
| *H01M 4/131* | (2010.01) |
| *H01M 4/1315* | (2010.01) |
| *H01M 4/133* | (2010.01) |
| *H01M 4/485* | (2010.01) |
| *H01M 4/505* | (2010.01) |
| *H01M 4/525* | (2010.01) |

(Continued)

(52) U.S. Cl.
CPC ............ *H01M 2/1653* (2013.01); *H01M 4/131* (2013.01); *H01M 4/133* (2013.01); *H01M 4/1315* (2013.01); *H01M 4/485* (2013.01); *H01M 4/505* (2013.01); *H01M 4/525* (2013.01); *H01M 10/052* (2013.01); *H01M 10/056* (2013.01); *H01M 10/0525* (2013.01); *H01M 10/0566* (2013.01); *H01M 10/0567* (2013.01); *H01M 10/0568* (2013.01); *H01M 10/0569* (2013.01); *H01M 10/4235* (2013.01); *H01M 2300/0025* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 4,513,143 A | 4/1985 | Ng et al. | |
| 4,612,216 A | 9/1986 | Kurfman | |

(Continued)

FOREIGN PATENT DOCUMENTS

| | | |
|---|---|---|
| JP | 75000095 | 1/1975 |
| JP | 10-189054 | 7/1998 |
| KR | 327487 | 3/2002 |

OTHER PUBLICATIONS

Sun, X. et al. Using a Boron-Based Anion Receptor Additive to Improve the Thermal Stability of LiPF6-Based Electrolyte for Lithium Batteries. Electrochemical and Solid-State Letters, 5 (11) A248-A251 (2002).*

(Continued)

*Primary Examiner* — A Eggerding
(74) *Attorney, Agent, or Firm* — Foley & Lardner LLP

(57) ABSTRACT

The present invention is generally related to electrolytes containing anion receptor additives to enhance the power capability of lithium-ion batteries. The anion receptor of the present invention is a Lewis acid that can help to dissolve LiF in the passivation films of lithium-ion batteries. Accordingly, one aspect the invention provides electrolytes comprising a lithium salt; a polar aprotic solvent; and an anion receptor additive; and wherein the electrolyte solution is substantially non-aqueous. Further there are provided electrochemical devices employing the electrolyte and methods of making the electrolyte.

24 Claims, 7 Drawing Sheets

(51) Int. Cl.
*H01M 10/052* (2010.01)
*H01M 10/0525* (2010.01)
*H01M 10/056* (2010.01)
*H01M 10/0566* (2010.01)
*H01M 10/0567* (2010.01)
*H01M 10/0568* (2010.01)
*H01M 10/0569* (2010.01)
*H01M 10/42* (2006.01)

(56) References Cited

U.S. PATENT DOCUMENTS

| | | | |
|---|---|---|---|
| 4,857,423 | A | 8/1989 | Abraham et al. |
| 5,456,000 | A | 10/1995 | Gozdz et al. |
| 5,487,959 | A | 1/1996 | Koksbang |
| 5,681,357 | A | 10/1997 | Eschbach et al. |
| 5,688,293 | A | 11/1997 | Oliver et al. |
| 5,709,968 | A | 1/1998 | Shimizu |
| 5,716,421 | A | 2/1998 | Pendalwar et al. |
| 5,731,106 | A | 3/1998 | Tsutsumi et al. |
| 5,763,119 | A | 6/1998 | Adachi |
| 5,770,290 | A | 6/1998 | McHenry et al. |
| 5,837,015 | A | 11/1998 | Venugopal et al. |
| 5,849,432 | A | 12/1998 | Angell et al. |
| 5,858,573 | A | 1/1999 | Abraham et al. |
| 6,004,698 | A | 12/1999 | Richardson et al. |
| 6,022,643 | A | 2/2000 | Lee et al. |
| 6,045,952 | A | 4/2000 | Kerr et al. |
| 6,074,777 | A | 6/2000 | Reimers et al. |
| 6,232,021 | B1 | 5/2001 | Negoro |
| 6,291,107 | B1 | 9/2001 | Shimizu |
| 6,352,798 | B1 | 3/2002 | Lee et al. |
| 6,387,571 | B1 | 5/2002 | Lain et al. |
| 6,475,678 | B1 | 11/2002 | Suzuki |
| 6,506,516 | B1 | 1/2003 | Wietelmann et al. |
| 6,676,713 | B1 | 1/2004 | Okada et al. |
| 6,780,545 | B2 | 8/2004 | Birke-Salam et al. |
| 2002/0039687 | A1 | 4/2002 | Barker et al. |
| 2003/0180611 | A1* | 9/2003 | Mikhaylik et al. ......... 429/218.1 |
| 2004/0029017 | A1 | 2/2004 | Besenhard et al. |
| 2004/0131934 | A1 | 7/2004 | Sugnaux et al. |
| 2004/0157126 | A1 | 8/2004 | Belharouak et al. |
| 2004/0191633 | A1 | 9/2004 | Johnson et al. |
| 2005/0019670 | A1* | 1/2005 | Amine et al. ................ 429/326 |
| 2005/0227143 | A1 | 10/2005 | Amine et al. |

OTHER PUBLICATIONS

International Search Report for PCT Application No. PCT/US06/08664, dated Dec. 13, 2006.

Yoshio, M. et al., "Storage and cycling performance of Cr-modified spinel at elevated temperatures," *Journal of Power Sources*, vol. 101, pp. 79-85, Aug. 29, 2001; published by Elsevier Science B.V.

Ravet, N. et al., "Electroactivity of natural and synthetic triphylite," *Journal of Power Sources*, vols. 97-98, pp. 503-507, Jul. 3, 2001; published by Elsevier Science B.V.

Davidson, I. J. et al., "Rechargeable cathodes based on $Li_2CR_xMn_{2-x}O_4$," *Journal of Power Sources*, vol. 54, pp. 205-208, 1995; published by Elsevier Science B.V.

Andersson, A. S. et al., "Lithium extraction/insertion in $LiFePO_4$: an X-ray diffraction and Mössbauer spectroscopy study," *Solid State Ionics*, vol. 130, pp. 41-52, Apr. 28, 2000; published by Elsevier Science B.V.

Xu, K. et al., "Lithium Bis(oxalate)borate Stabilizes Graphite Anode in Propylene Carbonate," *Electrochemical and Solid-State Letters*, vol. 5, No. 11, pp. A259-A262, 2002; published by The Electrochemical Society, Inc. Available electronically Sep. 10, 2002.

Kannan, A. M. et al., "Surface/Chemically Modified $LiMn_2O_4$ Cathodes for Lithium-Ion Batteries," *Electrochemical and Solid-State Letters*, vol. 5, No. 7, pp. A167-A169, 2002; published by The Electrochemical Society, Inc. Available electronically May 3, 2002.

Huang, H. et al., "Approaching Theoretical Capacity of $LiFePO_4$ at Room Temperature at High Rates," *Electrochemical and Solid-State Letters*, vol. 4, No. 10, pp. A170-A172, 2001; published by The Electrochemical Society, Inc. Available electronically Aug. 20, 2001.

Blyr, A. et al., "Self-Discharge of $LiMn_2O_4$/C Li-Ion Cells in Their Discharged State," vol. 145, No. 1, pp.194-209, Jan. 1998; published by The Electrochemical Society, Inc.

Chen, Z. et al., "Reducing Carbon in $LiFePO_4$/C Composite Electrodes to Maximize Specific Energy, Volumetric Energy, and Tap Density," *J. Electrochem. Soc.*, vol. 149, No. 9, pp. A1184-A1189, 2002; published by The Electrochemical Society, Inc. Available electronically Jul. 29, 2002.

Yamada, A. et al., "Optimized $LiFePO_4$ for Lithium Battery Cathodes," *J. Electrochem. Soc.*, vol. 148, No. 3, pp. A224-A229, Mar. 2001; published by The Electrochemical Society, Inc.

Franger, S. et al., "Optimized Lithium Iron Phosphate for High-Rate Electrochemical Applications," *J. Electrochem. Soc.*, vol. 151, vol. 7, pp. A1024-A1027, 2004; published by The Electrochemical Society, Inc. Available electronically May 27, 2004.

Chung, S.-Y. et al., "Electronically conductive phospho-olivines as lithium storage electrodes," *Nature Materials*, vol. 1, pp. 123-128, Oct. 2002; published by Nature Publishing Group. Published online Sep. 22, 2002.

Padhi, A. K. et al., "Phospho-olivines as Positive-Electrode Materials for Rechargeable Lithium Batteries," *J. Electrochem. Soc.*, vol. 144, No. 4, Apr. 1997; published by The Electrochemical Society, Inc.

Amatucci, G. G. et al., "Failure Mechanism and Improvement of the Elevated Temperature Cycling of $LiMn_2O_4$ Compounds Through the Use of the $LiAl_xMn_{2-x}O_{4-z}F_z$ Solid Solution," *J. Electrochem. Soc.*, vol. 148, No. 2, pp. A171-A182, 2001; published by The Electrochemical Society, Inc.

Sigala, C. et al., "Influence of the Cr Content on the Electrochemical Behavior of the $LiCr_yMn_{2-y}O_4$ ($0 \le y \le 1$) Compounds," *J. Electrochem. Soc.*, vol. 148, No. 8, pp. A826-A832, 2001; published by The Electrochemical Society, Inc. Available electronically Jun. 25, 2001.

Kellomäki, M. et al., "Processing and properties of two different poly (ortho esters)," *Journal of Materials Science; Materials in Medicine*, vol. 11, pp. 345-355, 2000; published by Kluwer Academic Publishers.

Lee, H. S. et al., "Synthesis of a Series of Fluorinated Boronate Compounds and Their Use as Additives in Lithium Battery Electrolytes," *J. Electrochem. Soc.*, vol. 151, No. 9, pp. A1429-A1435, 2004; published by The Electrochemical Society, Inc. Available electronically Aug. 18, 2004.

Lee, H. S. et al., "Synthesis of Anion Receptor Grafted Polymers and the Ionic Conductivity Studies of Polymer-Salt Complexes," *J. Electrochem. Soc.*, vol. 146, No. 3, pp. 941-946, Mar. 1999; published by The Electrochemical Society, Inc.

Chen, J. et al., "Chemical Overcharge and Overdischarge Protection for Lithium-Ion Batteries," *Electrochemical and Solid-State Letters*, vol. 8, No. 1, pp. A59-A62, 2005; published by The Electrochemical Society, Inc. Available electronically Nov. 29, 2004.

Komaba, S. et al., "2-Vinylpyridine as Film-forming Additve [sic] to Suppress the Degradation of Carbon Anode by Dissolved Manganese for E/$LiMn_2O_4$ Rechargable Battery," *Chemistry Letters*, vol. 31, No. 12, pp. 1236-1237, Dec. 2002; published by The Chemical Society of Japan.

Herstadt, M. et al., "Anion receptor for enhanced thermal stability of the graphite anode interface in a Li-ion battery," *Electrochemistry Communications*, vol. 5, pp. 467-472, Jun. 2003; published by Elsevier Science B.V.

Schmidtchen, F. P. et al., "Artificial Organic Host Molecules for Anions," *Chem. Rev.*, vol. 97, pp. 1609-1646, Aug. 1997; published by American Chemical Society.

Sun, X. et al., "Comparative Studies of the Electrochemical and Thermal Stability of Two Types of Composite Lithium Battery Electrolytes Using Boron-Based Anion Receptors," *J. Electrochem. Soc.*, vol. 146, No. 10, pp. 3655-3659, Oct. 1999; published by The Electrochemical Society, Inc.

Sun, X. et al., "Improved Elevated Temperature Cycling of $LiMn_2O_4$ Spinel Through the Use of a Composite LiF-Based Electrolyte," *Electrochemical and Solid-State Letters*, vol. 4, No. 11, pp. A184-A186, 2001; published by The Electrochemical Society, Inc. Available electronically Sep. 5, 2001.

(56) References Cited

OTHER PUBLICATIONS

Sun, X. et al., "The Compatibility of a Boron-Based Anion Receptor with the Carbon Anode in Lithium-Ion Batteries," *Electrochemical and Solid-State Letters*, vol. 6, No. 2, pp. A43-A46, 2003; published by The Electrochemical Society, Inc. Available electronically Jan. 3, 2003.

Sun, X. et al., "A Novel Lithium Battery Electrolyte Based on Lithium Fluoride and a Tris(pentafluorophenyl) Borane Anion Receptor in DME," *Electrochemical and Solid-State Letters*, vol. 1, No. 6, pp. 239-240, 1998; published by The Electrochemical Society, Inc. Available electronically Sep. 17, 1998.

Sun, X. et al., "Using a Boron-Based Anion Receptor Additive to Improve the Thermal Stability of $LiPF_6$-Based Electrolyte for Lithium Batteries," *Electrochemical and Solid-State Letters*, vol. 5, No. 11, pp. A248-A251, 2002; published by The Electrochemical Society, Inc. Available electronically Aug. 28, 2002.

* cited by examiner

NON-AQUEOUS ELECTROLYTES FOR LITHIUM ION BATTERIES

CROSS-REFERENCES TO RELATED APPLICATIONS

This application claims the priority to U.S. Provisional Application No. 60/662,056 filed Mar. 15, 2005, the entire contents of which are incorporated herein by reference.

GOVERNMENT RIGHTS

The United States Government has rights in this invention pursuant to Contract No. W31-109-ENG-38 between the U.S. Department of Energy and the University of Chicago representing Argonne National Laboratory.

FIELD OF THE INVENTION

The present invention relates in general to the field of lithium-ion rechargeable batteries, and more particularly relates to anion receptors as additives to non-aqueous electrolytes for lithium-ion batteries with improved power capabilities.

BACKGROUND OF THE INVENTION

Anion receptors are used as additives to non-aqueous electrolytes in lithium ion batteries to improve conductivity. Past research has been carried out on reducing the ion-pairing in non-aqueous electrolytes to enhance the conductivity of such solutions. The goal was to find ligands that could coordinate with either cations or anions, and hence increase the cation-anion distance and decrease the ion-pairing. Research on this issue has been summarized in a review article by F. P. Schidtchen et al., *Chem. Rev.*, 97, 1609 (1997).

Recent research has focused on providing neutral compounds as anion receptors for non-aqueous electrolytes. More specifically, in the field of lithium-ion batteries, an anion receptor is expected to form a complex with the anion of a lithium salt, and hence increase the transference number of lithium ions, to improve the conductivity of the electrolyte. A number of patents have disclosed various boron compounds suitable for this use, including U.S. Pat. No. 5,849,432 to Angell et al., and U.S. Pat. Nos. 6,352,198 and 6,022,643 to Lee et al. To improve the conductivity of the non-aqueous electrolyte, anion receptors are typically used at concentrations much greater than 0.1 molar (M), such as 0.5-1.0 M, so that they essentially function as a co-solvent to dissolve LiF and form new LiF salt-based electrolytes.

While previous work has demonstrated the capability of anion receptors to improve the conductivity of non-aqueous battery electrolytes, drawbacks to the use of anion receptors have not been widely recognized. As demonstrated herein, the conductivity gain of the electrolyte can be quickly offset by the impedance increase over the passivation films if high concentrations of anion receptors are employed. For example, a lithium-ion cell with 5 weight percent (wt %) tris(pentafluorophenyl)borane in the electrolyte (corresponding to a concentration of 0.1 M), has a higher overall impedance than the same cell without the additive. Hence, even though high concentrations of anion receptors improve the conductivity by dissolving LiF, impedance is also increased, leading to inferior cell performance as compared to electrolytes that lack anion receptors. Accordingly, new electrolyte solutions that retain good conductivity and low impedance are highly desirable.

SUMMARY OF THE INVENTION

The present invention relates to non-aqueous electrolytes for lithium-ion batteries, especially for high-power applications. Electrolytes of the invention use a limited amount of anion receptor additives to achieve high power through good conductivity and low impedance. Surprisingly, it has been discovered that use of a limited amount of anion receptor, to dissolve LiF in the passivation films on the electrodes, decreases the overall impedance of the lithium-ion cells or batteries. The limited amount of anion receptors used will not lead to detectable changes in electrolyte conductivity, and the deposition of anion receptors within a passivation film is minimized. The non-aqueous electrolyte of the present invention helps to develop a low-impedance passivation film on the battery electrodes, and hence, lithium-ion cells or batteries comprising such non-aqueous electrolytes possess improved power capabilities. Accordingly, the invention provides non-aqueous electrolytes, methods of making such electrolytes and electrochemical devices using the inventive electrolytes.

DETAILED DESCRIPTION

Figure 1:
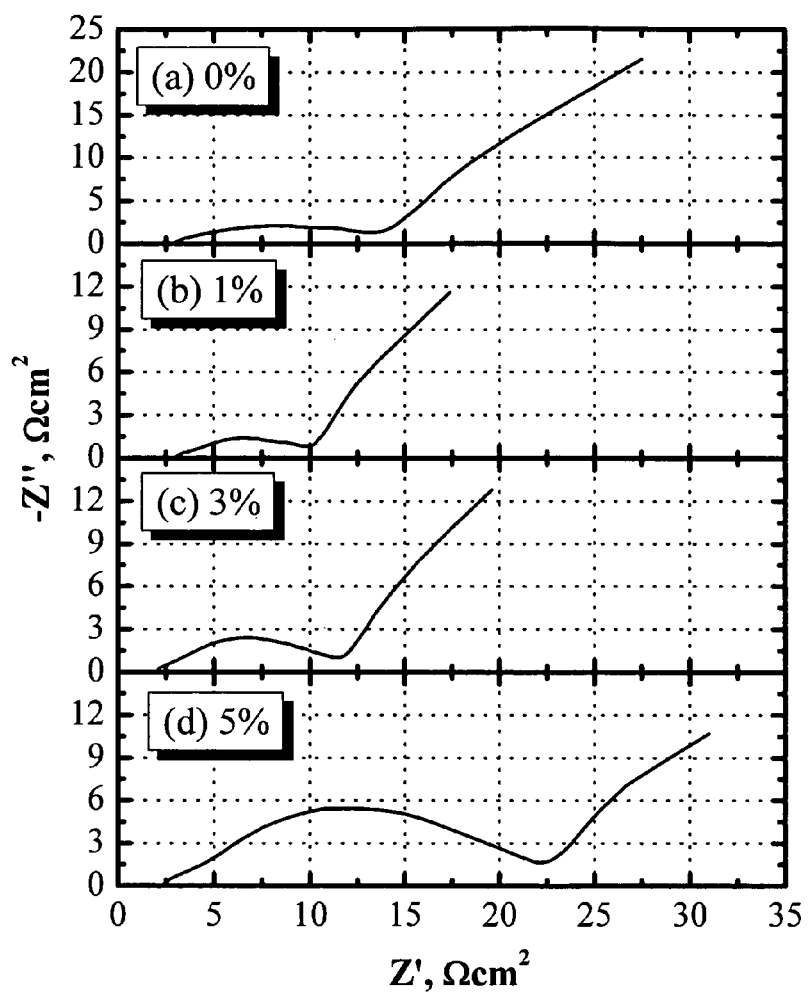
FIG. 1 is a graph of AC impedance for $LiNi_{1/3}Co_{1/3}Mn_{1/3}O_2$//1.2 M $LiPF_6$ in EC/PC/DMC (1:1:3)//graphite cells showing both the positive and negative impact of the anion receptor on the cell impedance.

The present invention relates to electrolytes containing anion receptors to improve the power performance and cyclability of lithium-ion batteries. In accordance with one aspect of the present invention, there are provided electrolytes that include a lithium salt; a polar aprotic solvent; and an anion receptor additive at a concentration of from 0.0005 M to 0.05 M. The additive assists in the dissolution of LiF on the surface of the electrodes. The electrolytes are substantially non-aqueous, i.e., the electrolytes contain either no water or almost no water (e.g., ≤100 ppm water). Mixtures of anion receptors may be used as the additive. Typically the additive is a Lewis acid such as a boron compound. Lewis acids are conventionally described as electron pair acceptors.

For example, anion receptors of the invention include compounds of Formula I:

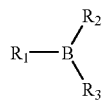

I wherein $R_1$, $R_2$, and $R_3$ are independently halogen, alkyl, aryl, haloalkyl, haloaryl, or $OR_4$; or any two of $R_1$, $R_2$, $R_3$, and $R_4$, together with the atoms to which they are attached, form a heterocyclic ring having 5-9 members, and $R_4$ is at each occurrence independently alkyl, aryl, haloalkyl, or haloaryl. In some such embodiments, $R_1$, $R_2$, and $R_3$ are independently halogen, alkyl, aryl, haloalkyl, or haloaryl; or any two of $R_1$, $R_2$, and $R_3$, together with the boron to which they are attached, form a heterocyclic ring having 5-9 members. In some embodiments halogens are selected from Cl, F, Br, or I, and a group having halogens may have all the same halogen or many different halogens.

Accordingly, in other such embodiments, the anion receptor has the Formula IA:

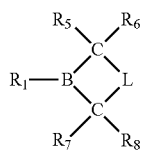

IA wherein $R_5$, $R_6$, $R_7$, and $R_8$ are independently halogen, alkyl, aryl, haloalkyl, haloaryl; and L is a $C_{1-6}$ alkylene group, optionally substituted with one or more halogens. L can also be a $C_{2-3}$ alkylene group, optionally substituted with one or more halogens. In some embodiments halogens are selected from Cl, F, Br, or I, and a group substituted with one or more halogens may have all the same halogen or many different halogens on the group.

In other embodiments of the compound of Formula I, the anion receptor has the Formula II:

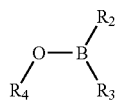

II in which $R_2$, $R_3$ and $R_4$ are as defined for Formula I. In some such embodiments, the anion receptor has the Formula IIA or IIB:

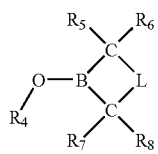

IIA

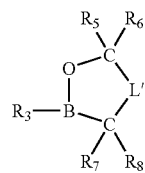

IIB wherein $R_5$, $R_6$, $R_7$, and $R_8$ are independently halogen, alkyl, aryl, haloalkyl, or haloaryl; L is a $C_{1-6}$ alkylene group, optionally substituted with one or more halogens; and L' is a $C_{1-5}$ alkylene group, optionally substituted with one or more halogens. L can also be a $C_{2-3}$ alkylene group optionally substituted with one or more halogens, and L' can be a $C_{1-2}$ alkylene group, optionally substituted with one or more halogens.

In yet other embodiments, the anion receptor has Formula III:

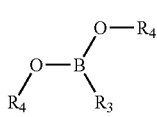

III in which $R_2$, $R_3$ and $R_4$ are as defined for Formula I. Exemplary anion receptors of Formula III include those having the Formula IIIA or IIIB:

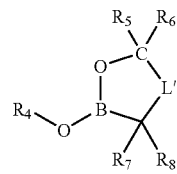

IIIA

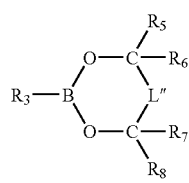

IIIB wherein $R_5$, $R_6$, $R_7$, and $R_8$ are independently halogen, alkyl, aryl, haloalkyl, or haloaryl; L' is a $C_{1-5}$ alkylene group, optionally substituted with one or more halogens; and L" is a $C_{1-3}$ alkylene group, optionally substituted with one or more halogens.

In still other embodiments, the anion receptor has the Formula IV:

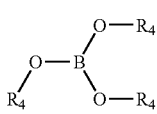

IV

In certain embodiments, the anion receptor of Formula IV has the Formula IVA:

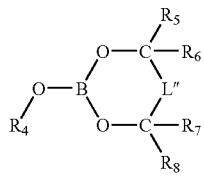

IVA wherein $R_5$, $R_6$, $R_7$, and $R_8$ are independently halogen, alkyl, aryl, haloalkyl, or haloaryl; and L" is absent or is a $C_{1-3}$ alkylene group, optionally substituted with one or more halogens. L" can also be absent or can be a methylene group, optionally substituted with one or more halogens.

Anion receptors of Formula I can also have the Formula VA or VB:

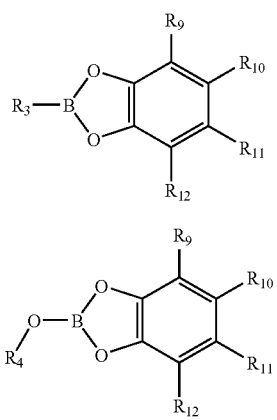

wherein $R_9$, $R_{10}$, $R_{11}$, and $R_{12}$ are hydrogen, halogen, alkyl, aryl, haloalkyl, haloaryl.

In inventive electrolytes, the anion receptor may be substituted with the halogen fluorine. For example, anion receptors of the invention include but are not limited to tris(1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl)borate, triphenylborate, tris(4-fluorophenyl)borate, tris(2,4-difluorophenyl)borate, tris(2,3,5,6-tetrafluorophenyl)borate, tris(pentafluorophenyl)borate, tris(3-trifluoromethylphenyl)borate, tris(3,5-bis(trifluoromethyl)phenyl)borate, tris(pentafluorophenyl)borane, or a mixture of any two or more thereof. Other suitable additives include 2-(2,4-difluorophenyl)-4-fluoro-1,3,2-benzodioxaborole, 2-(3-trifluoromethylphenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl)phenyl-tetrafluoro-1,3,2-benzodioxaborole, 2,5-bis(trifluoromethyl)phenyl-tetrafluoro-1,3,2-benzodioxaborole, 2-phenyl-4,4,5,5-tetrakis(trifluoromethyl)-1,3,2-benzodioxaborolane, 2-(3,5-difluorophenyl)-4,4,5,5-tetrakis(trifluoromethyl)-1,3,2-dioxaborolane, 2-pentafluorophenyl-4,4,5,5-tetrakis(trifluoromethyl)-1,3,2-dioxaborolane, bis(1,1,1,3,3,3-hexafluoroisopropyl)phenylboronate, bis(1,1,1,3,3,3-hexafluoroisopropyl)-3,5-difluorophenylboronate, bis(1,1,1,3,3,3-hexafluoroisopropyl)(pentafluorophenyl)boronate, or a mixture of any two or more thereof. A particularly suitable anion receptor additive is tris(pentafluorophenyl)borane.

Inventive electrolytes include a lithium salt dissolved in a polar aprotic solvent. The lithium salt is typically present at a concentration of from about 0.5 M to about 2 M. Exemplary lithium salts include $Li[PF_2(C_2O_4)_2]$, $Li[B(C_2O_4)_2]$, $Li[BF_2(C_2O_4)]$, $LiClO_4$, $LiBF_4$, $LiAsF_6$, $LiPF_6$, $LiCF_3SO_3$, $Li[N(CF_3SO_2)_2]$, $Li[C(CF_3SO_2)_3]$, $Li[N(SO_2C_2F_5)_2]$, lithium alkyl fluorophosphates, or a mixture of any two or more thereof. Lithium(chelato)borates such as $Li[B(C_2O_4)_2]$ and $Li[BF_2(C_2O_4)]$, and lithium(chelato)phosphates such as $Li[PF_2(C_2O_4)_2]$ can also be used as the lithium salt, or as an electrode stabilizing additive. Thus, in some embodiments, the lithium salt is other than a $Li[PF_2(C_2O_4)_2]$, $Li[B(C_2O_4)_2]$, or $Li[BF_2(C_2O_4)]$ and the electrolyte further includes $Li[PF_2(C_2O_4)_2]$, $Li[B(C_2O_4)_2]$, or $Li[BF_2(C_2O_4)]$, at e.g., from about 0.001 to about 8 wt %. As noted below, electrolytes having a blend of anion receptor and $Li[PF_2(C_2O_4)_2]$, $Li[B(C_2O_4)_2]$, and/or $Li[BF_2(C_2O_4)]$ as additives are particularly effective in preventing capacity fade during high temperature storage and cycling.

Suitable polar aprotic solvent include, for example, ethyl acetate, propyl acetate, ethylene carbonate, propylene carbonate, dimethyl carbonate, diethyl carbonate, ethyl methyl carbonate, diethyl ether, methyl acetate, gamma-butyrolactone, sulfolane, or a mixture of any two or more thereof. Protic solvents such as water and alcohols cannot be used with the present invention.

There are further provided methods of making the non-aqueous electrolytes of the present invention. For example, in some embodiments, the method includes combining a lithium salt; a polar aprotic solvent; and an anion receptor additive, as described herein, at a concentration of from about 0.0005 M to about 0.05 M. Thus, the anion receptor additive includes compounds of Formula I, IA, II, IIA, IIB, III, IIIA, IIIB, IV, IVA, VA, VB, and mixtures of any two or more thereof. The present methods can employ any of the lithium salts or polar aprotic solvents described herein.

While not wishing to be limited by any theory, it is believed that electrochemical devices of the present invention exhibit enhanced power performance due to the nature and amount of the anion receptor additives present in the non-aqueous electrolytes. Surprisingly, it has been discovered that the counterintuitive idea of using less rather than more, of the conductivity-enhancing anion receptor additive, results in an electrolyte with good conductivity and low impedance. Specifically, it is believed that trace amounts of LiF in the passivation films, formed from electrode stabilizing additives, can dramatically increase the interfacial impedance of lithium-ion batteries, and hence deteriorate their power capability. Moreover, the accumulation of LiF in the passivation films may also be responsible for the power fade of lithium-ion batteries. In the present invention, the anion receptor is used to dissolve trace amounts of LiF in the passivation films, and hence to improving the power capability of lithium-ion batteries.

The major difference of the present invention from previous U.S. patents (U.S. Pat. Nos. 5,849,432, 6,352,198 B1, and 6,022,643) lies in using a controlled amount of anion receptor to dissolve trace amounts of LiF in the passivation films of the electrodes only. In contrast, previous work used high concentrations of anion receptors (generally >0.2 M) essentially as a co-solvent to assist the lithium-ion transportation through the electrolytes. However, examples described herein show that the addition of high concentrations of anion receptors dramatically increases the interfacial impedance of lithium-ion batteries. For example, when more than 5 wt % (~0.1 M) tris(pentafluorophenyl)borane is added to a LiPF$_6$-based electrolyte, the interfacial impedance is so high that the gain of electrolyte conductivity is overwhelmed and the cell impedance is even higher than that without any anion receptor. Therefore, it is believed that an effective amount of anion receptor, which is just enough to dissolve LiF in the passivation films, is critical to maximize the power performance of lithium-ion batteries.

Furthermore, a synergistic effect has been discovered between low concentrations of anion receptor and low concentrations of Li[PF$_2$(C$_2$O$_4$)$_2$], Li[B(C$_2$O$_4$)$_2$], and/or Li[BF$_2$(C$_2$O$_4$)] additives. As shown in Examples 4 and 5, small amounts of either tris(pentafluorophenyl)borane or LiBOB improve the capacity retention of lithium ion batteries at high temperature cycling. However, when combined at 1 wt % each in the electrolyte, almost no capacity fade is observed over 50 cycles (see FIG. 9). Such superior performance has not previously been observed using anion receptors. Hence, there are further provided electrolytes having a blend of a first additive at a concentration of from about 0.0005 M to about 0.08 M, wherein the first additive is an anion receptor that assists in the dissolution of LiF on the surface of electrode; and a second additive of from about 0.001 to about 8 wt % of an electrode stabilizing additive that is Li[PF$_2$(C$_2$O$_4$)$_2$], Li[B(C$_2$O$_4$)$_2$], Li[BF$_2$(C$_2$O$_4$)], or a mixture of two or more thereof. In some embodiments, the concentration of the first additive is from about 0.0005M to 0.05, 0.06 or 0.07M, or from about 0.005 M to about 0.05, 0.06 or 0.07 M.

Electrolytes of the invention may include electrode stabilizing additives that protect the electrodes from degradation. (See, e.g., co-pending U.S. application Ser. Nos. 10/857,365 11/297,120, and 11/338,902.) Thus, electrolytes of the invention may include electrode stabilizing additives that can be reduced or polymerized on the surface of a negative electrode to form a passivation film on the surface of the negative electrode. Likewise, inventive electrolytes may include an electrode stabilizing additive that can be oxidized or polymerized on the surface of the positive electrode to form a passivation film on the surface of the positive electrode. In some embodiments, electrolytes of the invention may also include mixtures of the two types of electrode stabilizing additives. Some embodiments generally describe the formation of the passivation film as a decomposition of the electrode stabilizing additive. Electrode stabilizing additives may be decomposed through oxidation, reduction, oligomerization, polymerization, or other degradation that results in the formation of a passivating film on the electrode or electrodes of choice. The additives are typically present at a concentration of from about 0.001 to about 8 wt %.

Electrode stabilizing additives may generally be, a substituted or unsubstituted linear, branched or cyclic hydrocarbon comprising at least one oxygen atom and at least one aryl, alkenyl or alkynyl group. The passivating film formed from such electrode stabilizing additives may also be formed from a substituted aryl compound or a substituted or unsubstituted heteroaryl compound where the additive comprises at least one oxygen atom. Alternatively, a combination of two additives may be used. In some such embodiments, one additive is selective for forming a passivating film on the cathode to prevent leaching of metal ions and the other additive can be selective for passivating the anode surface to prevent or lessen the reduction of metal ions at the anode.

Representative electrode stabilizing additives include 1,2-divinyl furoate, 1-vinylazetidin-2-one, 1-vinylaziridin-2-one, 1-vinylpiperidin-2-one, 1-vinylpyrrolidin-2-one, 2,4-divinyl-1,3-dioxane, 2-amino-4-vinylcyclobutanone, 1,3-dimethyl butadiene, 2-amino-5-vinylcyclopentanone, 2-vinyl-aminocyclopropanone, 2-vinyloxy-cyclopropanone, 3-(N-vinylamino)-cyclohexanone, 3,5-divinyl furoate, 3-vinylazetidin-2-one, 3-vinylpyrrolidin-2-one, 4,4-divinyl-3-dioxolan-2-one, 5-vinylpiperidin-3-one, allylglycidyl ether, butadiene, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methyl phosphate, oxetan-2-yl-vinylamine, oxiranylvinylamine, piperidine, triethanolamine, trivinylphosphate, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl piperidine, vinyl-2-furoate, vinylcyclopropanone, vinylethylene oxide, β-vinyl-γ-butyrolactone, or a mixture of any two or more thereof. In some embodiments the electrode stabilizing additive may be a cyclotriphosphazene that is substituted with F, alkyloxy, alkenyloxy, aryloxy, methoxy, allyloxy groups, 2-amino-3-vinylcyclohexanone, 2-vinylaminocyclohexanol, 2-vinyloxetane, 2-vinyl-[1,2]oxazetidine, 3-vinylcyclobutanone, 3-vinylcyclopentanone, 3-vinyloxaziridine, 3-vinyloxetane, 1,3-butadiene carbonate, 4-vinyltetrahydropyran, 2-amino-3-vinylcyclopropanone, 3-vinylaziridin-2-one, or combinations thereof. For example, the additive may be, but is not limited to: (divinyl)(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy) cyclotriphosphazene, or (diaryloxy)(trifluoro)(methoxy) cyclotriphosphazene compounds, or a mixture of two or more thereof. In some embodiments, the electrode stabilizing additive is vinyl ethylene carbonate, vinyl carbonate, or 1,2-diphenyl ether, or a mixture of any two or more thereof.

Other representative electrode stabilizing additives may include compounds with aryl, phenyl, naphthyl, anthracenyl, pyrrolyl, oxazolyl, furanyl, indolyl, carbazolyl, imidazolyl, or thiophenyl groups. For example, electrode stabilizing additives may be 1,2-diphenyl ether, 1,2-diphenylethane, 1-divinylimidazole, 2,4-dimethyl-6-hydroxy-pyrimidine, 2,4-divinyl isooxazole, 2-aryl-cyclopropanone, 2-aryloxycyclopropanone, 2-diaryloxy-furoate, 3,4-divinyl-1-methyl pyrrole, 3-vinyltetrahydrofuran, 4-allylanisole, allylanisole, aryloxpyrrole, aryloxy ethylene sulfate, aryloxy-2-furoate, aryloxycarbazole, aryloxy-crotonate, aryloxy-cyclobutane, aryloxy-cyclopentanone, aryloxy-cyclophosphazene, aryloxy-cyclopropanone, aryloxy-ethyl-2-furoate, aryloxy-ethylene silicate, aryloxy-ethylene sulfate, aryloxy-ethylene sulfite, aryloxy-imidazole, aryloxy-methacrylate, aryloxy-o-terphenyl, aryloxyoxetane, aryloxy-phenyl carbonate, aryloxy-phosphate, aryloxy-piperidine, aryloxypyrazine, aryloxypyridazine, aryloxypyrrole, aryloxy-quinoline, aryloxy-tetrahydrofuran, biphenyl, butyl-aryloxy-ether, diaryloxy ethylene carbonate, diaryloxy furan, diaryloxy methyl phosphate, diaryloxy-butyl carbonate, diaryloxy-crotonate, diaryloxy-cyclotriphosphazene, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl diphenyl ether, divinyl furan, divinyl methoxy furan, divinyl methoxybipyridine, divinyl methoxydiphenyl ether, divinyl phenyl carbonate, divinylpyrazine, imidazole, indole, isoquinoline, methoxy-4-vinylbiphenyl, methoxycarbazole, methoxy-o-terphenyl, naphthalene, N-methyl pyrrole, o-terphenyl, pyrazine, pyridazine, pyridine, pyrimidine, quinoline, quinoxaline, (tetrahydrofuran-2-yl)-vinylamine, vinyl imidazole, vinyl indole, vinyl isoquinoline, vinyl methoxy carbazole, vinyl methoxy imidazole, vinyl methoxy piperidine, vinyl methoxypyrazine, vinyl methoxyquinoline, vinyl methyl carbonate, vinyl pyrazine, vinyl pyridazine, vinyl pyridazine, vinyl pyridine, vinyl pyrimidine, vinyl quinoline, vinyl quinoxaline, vinylmethoxy pyrrole, vinyl-tetrahydrofuran, or a mixture of any two or more thereof.

Electrode stabilizing additives particularly suitable for use in the practice of the present invention may include a substituted or unsubstituted spirocyclic hydrocarbon containing at least one oxygen atom and at least one alkenyl or alkynyl group. For example, such electrode stabilizing additives include those having Formula VI:

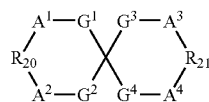

wherein
$A^1$, $A^2$, $A^3$, and $A^4$ are independently O or $CR_{22}R_{23}$; provided that $A^1$ is not O when $G^1$ is O, $A^2$ is not O when $G^2$ is O, $A^3$ is not O when $G^3$ is O, and $A^4$ is not O, when $G^4$ is O;

$G^1$, $G^2$, $G^3$, and $G^4$ are independently O or $CR_{22}R_{23}$; provided that $G^1$ is not O when $A^1$ is O, $G^2$ is not O when $A^2$ is O, $G^3$ is not O when $A^3$ is O, and $G^4$ is not O when $A^4$ is O;

$R_{20}$ and $R_{21}$ are independently a substituted or unsubstituted divalent alkenyl or alkynyl group;

$R_{22}$ and $R_{23}$ at each occurrence are independently H, F, Cl, Br, or a substituted or an unsubstituted alkyl, alkenyl, or alkynyl group.

Representative examples of Formula VI include but are not limited to 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5] undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof. Furthermore, mixtures of any two or more electrode stabilizing additives may also be used in the electrolytes of the present invention.

In another aspect, the invention provides an electrochemical device comprising: a cathode; an anode; and an electrolyte as described herein. In one embodiment, the electrochemical device is a lithium secondary battery; the cathode is a lithium metal oxide cathode; the anode is a carbon or lithium metal anode; and the anode and cathode are separated from each other by a porous separator. In such devices the anode may comprise graphite, amorphous carbon, $Li_4Ti_5O_{12}$, tin alloys, silicon alloys, intermetallic compounds, lithium metal, or mixtures of any two or more thereof. Suitable graphitic materials including natural graphite, artificial graphite, graphitized meso-carbon microbeads, and graphite fibers, as well as any amorphous carbon materials. Typically, the cathode in such a cell includes spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.5}O_2$, $LiMn_{1/3}Co_{1/3}Ni_{1/3}O_2$, $LiMn_2O_4$, $LiFeO_2$, $LiMet'''_{0.5}Mn_{1.5}O_4$, $Li_{1+x}Ni_\alpha Mn_\beta Co_y Met'_\delta O_{2-z'}F_{z'}$, $A_{n'}B_2(XO_4)_3$ (NASICON), vanadium oxide, or mixtures of any two or more thereof, wherein Met is Al, Mg, Ti, B, Ga, Si, Mn, or Co; Met' is Mg, Zn, Al, Ga, B, Zr, or Ti; Met''' is Al, Mg, Ti, B, Ga, Si, Ni, or Co; A is Li, Ag, Cu, Na, Mn, Fe, Co, Ni, Cu, or Zn; B is Ti, V, Cr, Fe, or Zr; X is P, S, Si, W, or Mo; $0 \le x \le 0.3$, $0 \le y \le 0.5$, $0 \le z \le 0.5$; $0 \le x' \le 0.4$, $0 \le \alpha \le 1$, $0 \le \beta \le 1$, $0 \le \gamma \le 1$, $0 \le \delta \le 0.4$, and $0 \le z' \le 0.4$; and $0 \le n' \le 3$.

In the electrochemical cells of the present invention, the cathode can include spinel, olivine, or carbon-coated olivine (see Published U.S. Patent Application No. 2004/0157126). For example, the spinel can be a spinel manganese oxide with the formula of $Li_{1+x}Mn_{2-z}Met'''_yO_{4-m}X'_n$, wherein Met''' is Al, Mg, Ti, B, Ga, Si, Ni, or Co; X' is S or F; and wherein $0 \le x \le 0.3$, $0 \le y \le 0.5$, $0 \le z \le 0.5$, $0 \le m \le 0.5$ and $0 \le n \le 0.5$. Alternatively, the cathode can comprise olivine with a formula of $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \le x \le 0.3$, $0 \le y \le 0.5$, $0 \le z \le 0.5$, $0 \le m \le 0.5$ and $0 \le n \le 0.5$.

Cathodes of the present invention may be further stabilized by surface-coating the particles of the spinel or olivine with a material that can neutralize acid or otherwise lessen or prevent leaching of the manganese or iron ions. Hence the cathodes can also comprise a surface coating of a metal oxide on the spinel or olivine particles such as $ZrO_2$, $TiO_2$, $ZnO_2$, $WO_3$, $Al_2O_3$, $MgO$, $SiO_2$, $SnO_2$, $AlPO_4$, $Al(OH)_3$, a mixture of any two or more thereof, or any other suitable metal oxide. The coating can also be applied to a carbon-coated olivine. Where carbon-coated olivine is used, the metal oxide coating can be applied to the carbon-coated olivine or can be applied to the olivine first, followed by carbon-coating of the metal oxide film. Methods for coating spinel cathodes with metal oxides are disclosed below and may be adapted for use with olivine cathodes.

The metal oxide coating on spinel may be applied using a variety of processes. For example, the coating element source may be dissolved in an organic solvent or water. Coating element sources may include metal alkoxides, salts or oxides (e.g., aluminum isopropoxide or magnesium methoxide). Spinel cathode materials are then dispersed in the coating solution. The mixture is stirred until the organic solvent is completely evaporated. If necessary, a flushing gas ($CO_2$ or moisture-free inert gas) may be used to help facilitate evaporation of the solvent in the coating solution. The dried, coated material is then heat-treated at a temperature ranging from about 100° C. to about 500° C.

A $TiO_2$ coating can be applied to spinel powders by hydroxylation of tetra-n-butyl titanate (TBT). Thus, for example, the titanate can be reacted with LiOH to precipitate the titanium hydroxide onto the spinel powder. The coated material can be heat-treated at about 100° C. to about 400° C. to yield spinel particles with the desired oxide coating.

A sol-gel process may also be employed in the coating of the spinel. Coating materials, including M-ethylhexanate and M-isopropoxide (M=Zr, Al, Ti, B, Si, Sn), may be dissolved in alcohol (e.g., 2-propanol). The cathode materials are then mixed with the coating solution and annealed at from about 100° C. to about 500° C. Alternatively, a coating solution can be prepared by dissolving ethyl silicate in ethanol and water. Spinel powder is immersed in the coating solution, stirred, dried at 110° C., and calcined at from about 200° C. to about 500° C.

The process of coating spinel with $AlPO_4$ can be carried out by dissolving aluminum nitrate and ammonium phosphate in water until a light white suspension (the $AlPO_4$ nanoparticle solution) is observed in the solution. Spinel cathode powder may then be added to the coating solution and mixed. The slurry may be dried and annealed at from about 100° C. to about 500° C.

Colloidal suspensions may also be used to coat spinel with metal oxides. For example, the spinel powders can be coated using a 4 wt % (~3 mol %) colloidal $ZrO_2$ suspension. The spinel particles are immersed and stirred in the $ZrO_2$ suspension for about 1 h, followed by evaporation of the nascent liquid at 75° C. Thereafter, the products may be heated at from about 200° C. to about 400 or 500° C.

Alternatively, the $ZrO_2$ coating of spinel can be carried out by using two different coating solutions (zirconium oxide+ polymeric precursor or an aqueous solution of zirconium nitrate). Spinel may be mixed with the coating solutions until the mixture is dry. Then the mixture may be heated at 100° C. to evaporate the solvents in the coating solutions. The dried mixture may be heat-treated at 200-500° C.

A $ZnO_2$ coating may be applied to the spinel by dissolving zinc acetate in water, followed by adding the spinel powder, and thoroughly mixing for about 4 h at room temperature. After drying, the coated powder may be heated at 120° C., and further calcined at from about 200° C. to about 400° C.

Finally, spinel can be coated using a co-precipitation process. Spinel powder is dispersed into a $NaHCO_3$ solution and ultrasonically agitated. The suspension is then stirred mechanically while $Al_2(SO_4)_3$ solution is added dropwise to it. In this way, $Al(OH)_3$ is precipitated onto the spinel particle surface. The final powder is filtered, washed, and dried. The dried powder is heated in air at from about 200° C. to about 600° C.

Electrochemical devices employing electrodes comprised of blends of materials are also within the scope of the present invention. For example, the cathode can include a blend of spinel and $Li_{1+x}Ni_\alpha Mn_\beta Co_\gamma Met'_\delta O_{2-z}F_{z'}$ wherein Met' is Mg, Zn, Al, Ga, B, Zr, or Ti; and $0\le z'\le 0.4$. The ratio of spinel to wherein $0\le x'\le 0.4$, $0\le\alpha\le 1$, $0\le\beta\le 1$, $0\le\gamma\le 1$, $0\le\delta\le 0.4$, and $Li_{1+x}Ni_\alpha Mn_\beta Co_\gamma Met'_\delta O_{2-z}F_{z'}$ is typically from about 0.5 to about 98 wt %. Suitable cathodes can also include a blend of olivine or carbon-coated olivine and $Li_{1+x}Ni_\alpha Mn_\beta Co_\gamma Met'_\delta O_{2-z}F_{z'}$, wherein Met' is Mg, Zn, Al, Ga, B, Zr, or Ti; and wherein $0\le x'\le 0.4$, $0\le\alpha\le 1$, $0\le\beta\le 1$, $0\le\gamma\le 1$, $0\le\delta\le 0.4$, and $0\le z'\le 0.4$. As before, the ratio of olivine or carbon-coated olivine to $Li_{1+x}Ni_\alpha Mn_\beta Co_\gamma Met'_\delta O_{2-z}F_{z'}$ can be from about 0.5 to about 98 wt %.

The porous separator may be made from materials well known to those skilled in the art. Typically, the porous separator comprises polypropylene, polyethylene, or a multilayer laminate of polypropylene and polyethylene.

Thus, in accordance with one embodiment, the electrochemical device of the invention includes a spinel, olivine, or carbon-coated olivine cathode; a graphite or amorphous carbon anode; and a substantially non-aqueous electrolyte comprising a lithium metal salt that is $Li[PF_2(C_2O_4)_2]$, $Li[BF_2(C_2O_4)]$, $Li[B(C_2O_4)_2]$, or a mixture of two or more thereof; a polar aprotic solvent that is ethyl acetate, propyl acetate, ethylene carbonate, propylene carbonate, dimethyl carbonate, diethyl carbonate, ethyl methyl carbonate, dimethyl ether, diethyl ether, methyl acetate, gamma-butyrolactone, sulfolane, or a mixture of any two or more thereof; an anion receptor; and an electrode stabilizing additive.

The following terms are used throughout as defined below.

Spirocyclic hydrocarbons include ring systems comprising carbon and hydrogen and having two or more rings in which at least two of the rings are joined at a single carbon.

The term "spinel" refers to manganese-based spinel such as, e.g., $Li_{1+x}Mn_{2-z}Met'''_y O_{4-m}X'_n$, wherein Met''' is Al, Mg, Ti, B, Ga, Si, Ni, or Co; X' is S or F; and wherein $0\le x\le 0.3$, $0\le y\le 0.5$, $0\le z\le 0.5$, $0\le m\le 0.5$ and $0\le n\le 0.5$.

The term "olivine" refers to iron-based olivine such as, e.g., $Li_{1+x}Fe_{1-z}Met''_y PO_{4-m}X'_n$, wherein Met'' is Al, Mg, Ti, B, Ga, Si, Ni, Mn or Co; X' is S or F; and wherein $0\le x\le 0.3$, $0\le y\le 0.5$, $0\le z\le 0.5$, $0\le m\le 0.5$ and $0\le n\le 0.5$.

Alkyl groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups.

Alkylene groups are divalent alkyl groups as defined above, i.e., alkyl groups with two points of attachment within a structure. The attachment points may be on the same or different carbons. Thus, exemplary alkylene groups include $-CH_2-$, $-CH_2CH_2-$, $CHCH_3$, $-CH(CH_3)_2-$, and the like. Halogens include fluorine, chlorine, bromine, and iodine. Typically, anion receptors of the invention are substituted with one or more fluorine or chlorine atoms, but are not so limited.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, alkoxy, carboxy, carboxamide, oxo, imino, and/or halo groups such as F, Cl, Br, and I groups.

Haloalkyl groups and halogen substituted groups are substituted alkyl groups as defined above in which one or more hydrogens have been replaced with one or more halogens such as fluorine, chlorine, bromine, and iodine. Haloalkyl groups may contain one or more different halogen atoms. Fluoroalkyl groups are haloalkyl groups in which the halogen(s) are fluorine.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, including but not limited to: $CH_2$, $CH=CH$, $C=CH_2$, $CH_2-CH-CH_3$, or $C=CHCH_3$.

Alkynyl groups are straight chain or branched alkyl groups having 2 to about 20 carbon atoms, and further including at least one triple bond. In some embodiments alkynyl groups have from 1 to 12 carbons, or, typically, from 1 to 8 carbon atoms. Exemplary alkynyl groups include, but are not limited to, ethynyl, propynyl, and butynyl groups. Alkynyl groups may be substituted similarly to alkyl groups. Divalent alkynyl groups, i.e., alkynyl groups with two points of attachment, include but are not limited to CH—C≡CH.

Aryl groups are cyclic aromatic hydrocarbons that do not contain heteroatoms. Thus aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, and naphthenyl groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once, such as, but not limited to: 2-; 3-; 4-; 5-; or 6-substituted phenyl or naphthyl groups, which may be substituted with groups including, but not limited to, amino, alkoxy, alkyl, cyano, and/or halo.

Haloaryl groups and halogen substituted aryl groups are substituted aryl groups as defined above in which one or more hydrogens have been replaced with one or more halogens such as fluorine, chlorine, bromine, and iodine. Haloaryl groups may contain one or more different halogen atoms. Fluoroaryl groups are haloaryl groups in which the halogen(s) are fluorine.

Heterocyclic rings include aromatic and non-aromatic ring compounds containing 3 or more ring members, of which, one or more is a heteroatom such as, but not limited to, N, O, and S. In some embodiments, heterocyclyl groups include 3 to 20 ring members, other such groups have 3 to 15 ring members, and in some embodiments 5-9 ring members. The phrase "heterocyclyl group" includes mono-, bi-, and polycyclic ring systems. Heterocyclyl groups thus include fused ring species including those comprising fused aromatic and non-aromatic groups. However, the phrase does not include heterocyclyl groups that have other groups, such as alkyl or halo groups, bonded to one of the ring members. Rather, these are referred to as "substituted heterocyclyl groups". Heterocyclyl groups include, but are not limited to, pyrrolidinyl, piperidinyl, piperazinyl, morpholinyl, pyrrolyl, pyrazolyl, triazolyl, imidazolyl, imidazolidinyl, tetrazolyl, oxazolyl, oxazolinyl, oxazolidinyl, isoxazolyl, isoxazolinyl, isoxazolidinyl, thiazolyl, pyridinyl, pyridazinyl, pyrazinyl, pyrimidinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclic rings may be mono-substituted or substituted more than once, such as, but not limited to, pyridazinyl, pyridinyl, oxazolidinyl, oxazolinyl, or oxazolyl groups, which are 2-, 3-, 4-, 5-, or 6-substituted, or disubstituted with groups including, but not limited to, amino, hydroxyl, thio, alkoxy, alkyl, cyano, and/or halo.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

The impact of the anion receptors on the impedance and power capability of lithium-ion cells or batteries was investigated using 2032 type coin cell hardware. The coin cell comprises a positive electrode, a microporous separator, a negative electrode, and a non-aqueous electrolyte. The high-power performance of the lithium-ion cells was investigated by the hybrid pulse power characteristic (HPPC) testing method set by the Partnership for New Generation Vehicles (PNGV) program.

Example 1

FIG. 1 shows the AC impedance of lithium-ion cells comprising a $LiNi_{1/3}Co_{1/3}Mn_{1/3}O_2$ cathode, soft carbon-coated natural graphite (GDR) anode, and an electrolyte of 1.2 M $LiPF_6$ in EC/PC/DMC (1:1:3 by weight). The AC impedance data were collected after the formation cycles and the cell being constant-voltage charged to 3.97 V (60% SOC). One wt % tris(pentafluorophenyl)borane (0.02 M) is enough to help dissolve the LiF in the passivation films and significantly reduce the cell impedance. When more than 1 wt % tris (pentafluorophenyl)borane was added, the cell impedance increased with the concentration of anion receptor dramatically, although the conductivity of the electrolyte was expected to decrease. When 5 wt % tris(pentafluorophenyl) borane was added, the cell impedance increased so dramatically that it was even higher than that without the anion receptor. Based on these results, cells based on previous patents (U.S. Pat. Nos. 5,849,432, 6,352,798, and 6,022,643), where more than 0.2 M (~10 wt %) anion receptor was added to a practical electrolyte, should exhibit much higher cell impedance than the cells without the anion receptor.

Example 2

Figure 2:
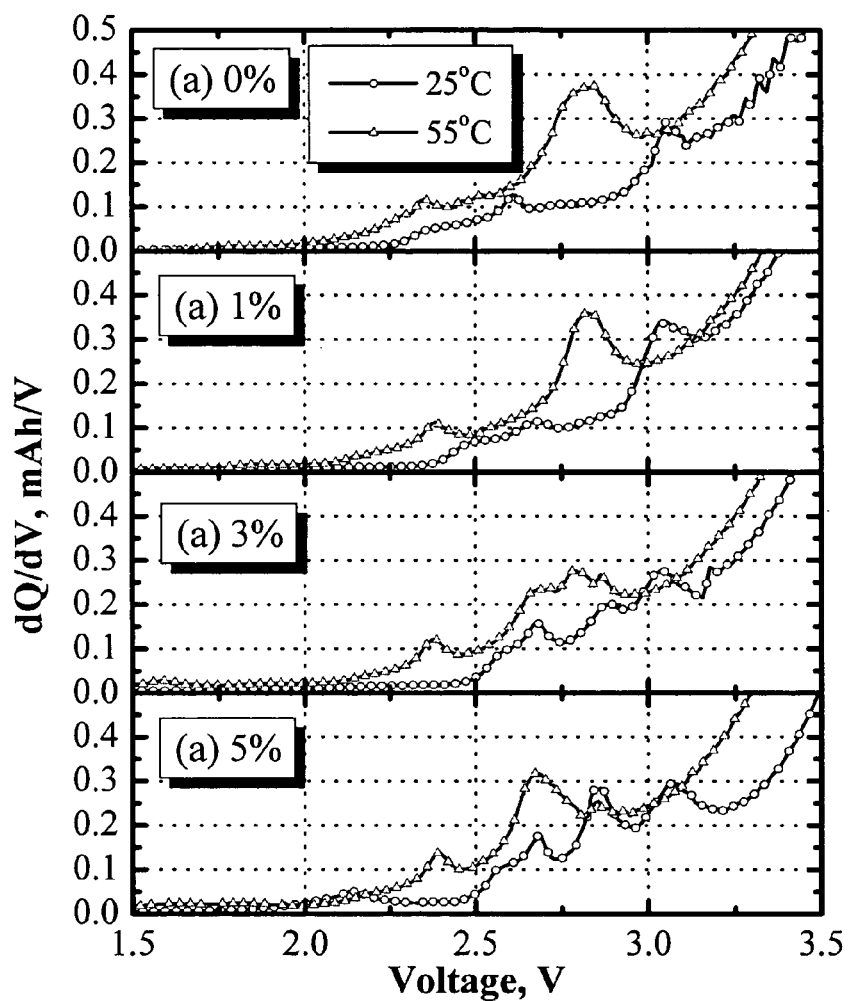
FIG. 2 is a graph of the differential capacity profile for $LiNi_{1/3}Co_{1/3}Mn_{1/3}O_2$//1.2 M $LiPF_6$ in EC/PC/DMC (1:1:3)//graphite cells containing (a) 0 wt %, (b) 1 wt %, (c) 3 wt %, and (d) 5 wt % tris(pentafluorophenyl)borane.

FIG. 2 shows the differential capacity profile of $LiNi_{1/3}Co_{1/3}Mn_{1/3}O_2$//GDR cells during the initial charging step. Several peaks under 3.0 V were attributed to the electrochemical reactions during the formation of a solid electrolyte interphase (SEI). Apparently, addition of 1 wt % tris (pentafluorophenyl)borane has almost no significant impact on the formation of the SEI layer except that it helps to dissolve LiF from the passivation film, which is not an electrochemical process. However, a dramatic change on the differential capacity profile was observed when more than 3 wt % tris(pentafluorophenyl)borane was added. The change of the dQ/dV profile is a clear evidence that the anion receptor, tris(pentafluorophenyl)borane, participates in the formation of the SEI layer and can be related to the increasing cell impedance as shown in FIG. 1.

Example 3

Figure 3:
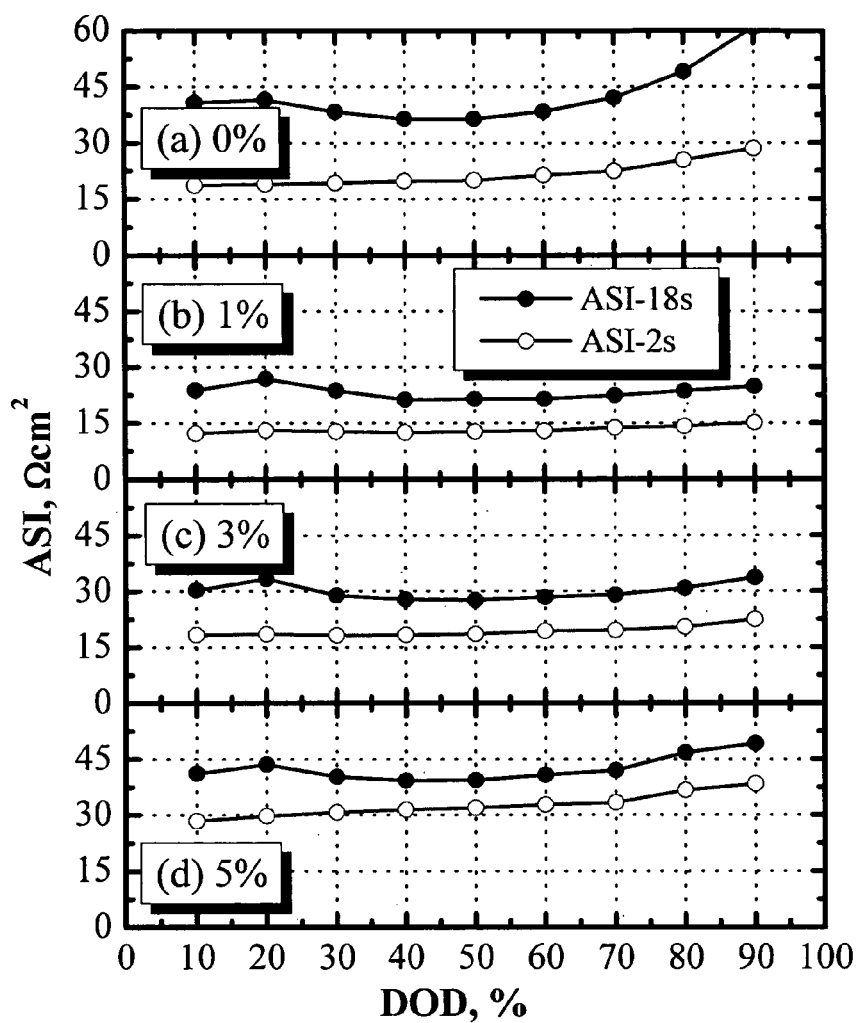
FIG. 3 is a graph showing area-specific impedance (ASI) during an HPPC test of $LiNi_{1/3}Co_{1/3}Mn_{1/3}O_2$//1.2 M $LiPF_6$ in EC/PC/DMC (1:1:3)//graphite cells containing (a) 0 wt %, (b) 1 wt %, (c) 3 wt %, and (d) 5 wt % tris(pentafluorophenyl)borane.
Figure 4:
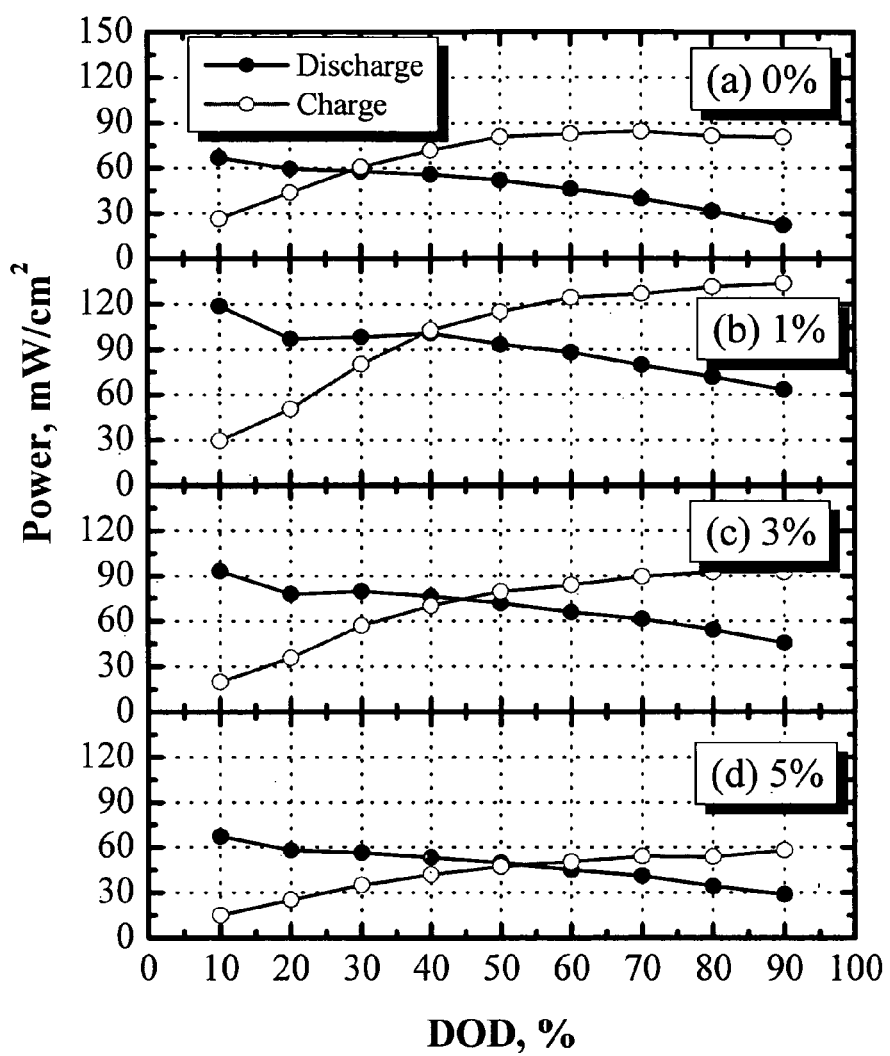
FIG. 4 is a graph of the pulse power capability of $LiNi_{1/3}Co_{1/3}Mn_{1/3}O_2$//1.2 M $LiPF_6$ in EC/PC/DMC (1:1:3)//graphite cells containing (a) 0 wt %, (b) 1 wt %, (c) 3 wt %, and (d) 5 wt % tris(pentafluorophenyl)borane.
Figure 5:
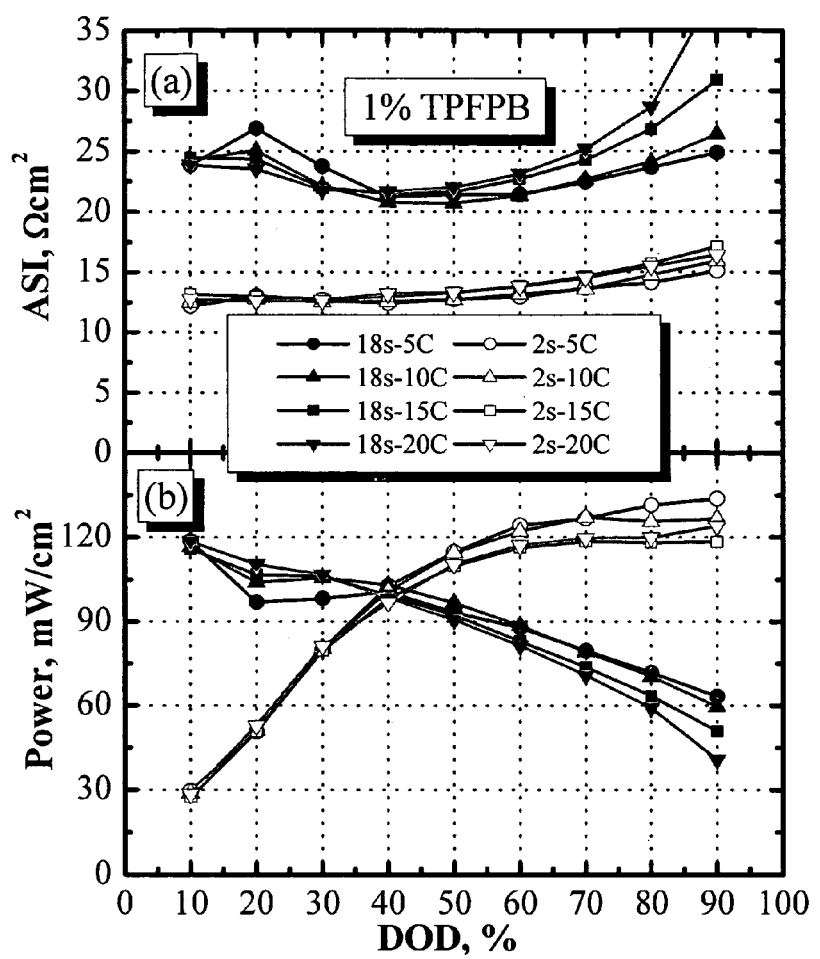
FIG. 5 is a graph of (a) area-specific impedance and (b) pulse power capability for $LiNi_{1/3}Co_{1/3}Mn_{1/3}O_2$//1.2 M $LiPF_6$ in EC/PC/DMC (1:1:3)//graphite cells containing 1 wt %, tris(pentafluorophenyl)borane (TPFPB).

FIGS. 3 and 4 show the results of hybrid pulse power characteristics tests on LiNi$_{1/3}$Co$_{1/3}$Mn$_{1/3}$O$_2$//1.2 M LiPF$_6$ in EC/PC/DMC (1:1:3)//GDR cells incorporating different amounts of the anion receptor, tris(pentafluorophenyl)borane. The pulse current during the test is at a 5 C rate. The results shown in FIGS. 3 and 4 are consistent with those shown in FIGS. 1 and 2. Clearly, the cell incorporating 1 wt % tris(pentafluorophenyl)borane has the lowest ASI and the highest power capability. In fact, the ASI of the cell with 1 wt % tris(pentafluorophenyl)borane has already exceeded the power requirement for hybrid electric vehicle (HEV) applications. To meet the power requirement for HEV applications, the battery should have ASI of 35 Ωcm$^2$ or less for an 18-second pulse discharge, and 25 Ωcm$^2$ or less for a 2-second pulse regenerative charge. FIG. 3b shows that the cell ASI is about 15 Ωcm$^2$ and 25 Ωcm$^2$ for a 2-second pulse regeneration and an 18-second pulse discharge, respectively. In this case, the pulse current rate was only 5 C. FIG. 5a shows that the ASI of the cell still exceeds the power requirement for HEV applications even when the cell was pulsed at 20 Crate during the charge and discharge. FIG. 5b shows that the power capability of the cell decreases a little bit with the increase in pulse current rate. However, the power capability of the cell at the 20 C rate is still better that that of the cell without additive at the 5 Crate (see FIG. 4a).

Example 4

Figure 6:
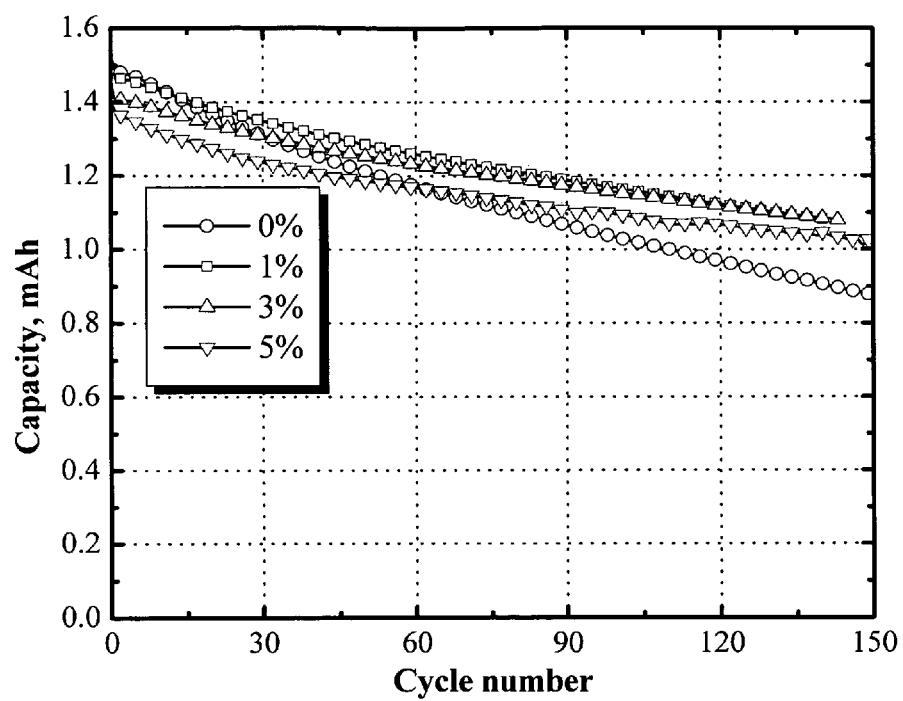
FIG. 6 is a graph of capacity v. cycle number showing the impact of tris(pentafluorophenyl)borane on the high temperature (55° C.) performance of $LiNi_{1/3}Co_{1/3}Mn_{1/3}O_2$//1.2 M $LiPF_6$ in EC/PC/DMC (1:1:3)//graphite cells.

FIG. 6 shows the cycling performance of the LiNi$_{1/3}$Co$_{1/3}$Mn$_{1/3}$O$_2$/1.2 M LiPF$_6$ in EC/PC/DMC (1:1:3)//GDR cells with 0 wt %, 1 and 5 wt % tris(pentafluorophenyl)borane, respectively. All the cells were cycled with a constant current of C/3 (~0.5 mA) at 55° C. The addition of tris(pentafluorophenyl)borane improves the capacity retention of the cell, and 1-3 wt % of tris(pentafluorophenyl)borane is desired in terms of the capacity retention at elevated temperatures.

Example 5

Figure 7:
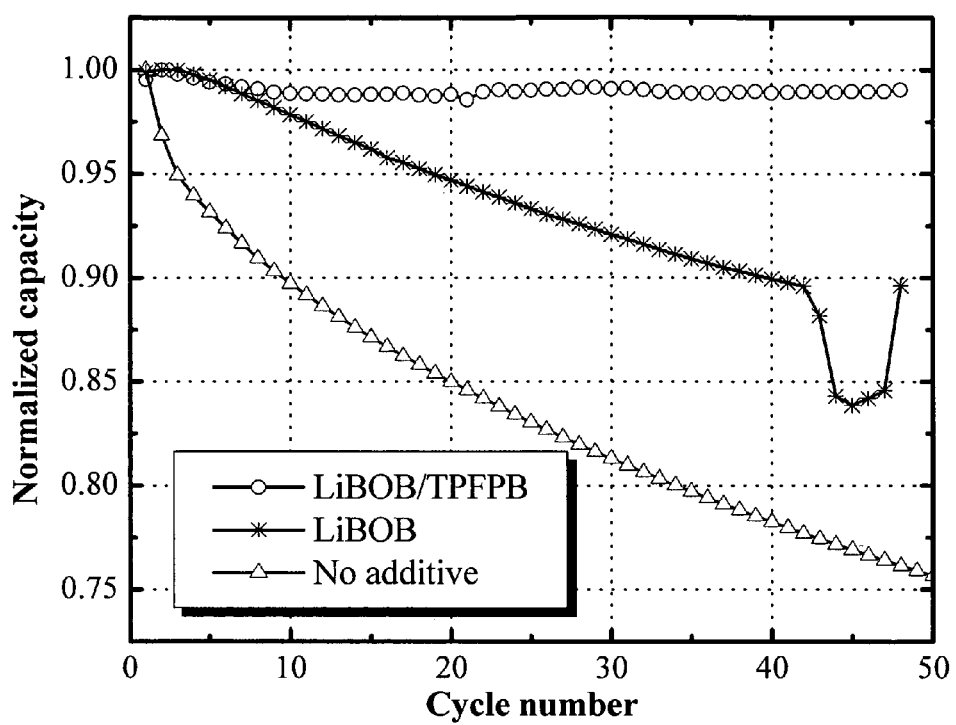
FIG. 7 is a graph showing capacity retention of $Li_{1+x}Mn_2O_4$/MCMB cells both with and without tris(pentafluorophenyl)borane blended with $Li[B(C_2O_4)_2]$ (LiBOB) as an additive at 55° C. with a constant current of C/2 (0.8 mA).

FIG. 7 shows the capacity retention of Li$_{1+x}$Mn$_2$O$_4$/MCMB cells with and without additives. The cells were cycled at 55° C. with a constant current of C/2 (0.8 mA). The cell with 1.2 M LiPF$_6$ in EC/PC/DMC (1:1:3 by weight) exhibited fast capacity fading: nearly 25% capacity was lost in 50 cycles. However, when the LiPF$_6$-based electrolyte was mixed with 0.7 M LiBOB in EC/PC/DMC (1:1:3) at a ratio of 9:1, the cell had much better capacity retention as shown in FIG. 7. The capacity retention of the cell was further improved by forming a blend of 1 wt % tris(pentafluorophenyl)borane and 1 wt % LiBOB. As shown in FIG. 7, the combination of small amounts of LiBOB and anion receptor additives significantly enhances the cycling performance of lithium-ion batteries and shows much better cycling than when using anion receptors as additives alone, even at 1 wt % concentration.

What is claimed is:

1. An electrolyte comprising:
    a lithium salt;
    a polar aprotic solvent;
    an additive at a concentration of 0.0005 M to 0.05 M, and about 0.001 to about 8 wt % of an electrode stabilizing additive that is Li[PF$_2$(C$_2$O$_4$)$_2$], Li[B(C$_2$O$_4$)$_2$], Li[BF$_2$(C$_2$O$_4$)], or a mixture of any two or more thereof;
    wherein:
        the additive is an anion receptor that assists in the dissolution of LiF on the surface of electrodes; and
        the lithium salt is other than Li[PF$_2$(C$_2$O$_4$)$_2$], Li[B(C$_2$O$_4$)$_2$], or Li[BF$_2$(C$_2$O$_4$)].

2. The electrolyte of claim 1, wherein the anion receptor is a Lewis acid.

3. The electrolyte of claim 1, wherein the anion receptor has the Formula I:

wherein
R$_1$, R$_2$, and R$_3$ are independently halogen, alkyl, aryl, haloalkyl, haloaryl, or OR$_4$; or any two of R$_1$, R$_2$, R$_3$, and R$_4$, together with the atoms to which they are attached, form a heterocyclic ring having 5-9 members; and
R$_4$ is at each occurrence independently alkyl, aryl, haloalkyl, or haloaryl.

4. The electrolyte of claim 3, wherein the anion receptor has the Formula IA:

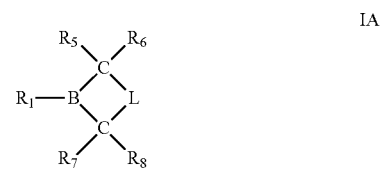

wherein
R$_5$, R$_6$, R$_7$, and R$_8$ are independently halogen, alkyl, aryl, haloalkyl, haloaryl; and
L is a C$_{1-6}$ alkylene group, optionally substituted with one or more halogens.

5. The electrolyte of claim 4, wherein L is a C$_{2-3}$ alkylene group, optionally substituted with one or more halogens.

6. The electrolyte of claim 3, wherein the anion receptor has Formula II:

7. The electrolyte of claim 6, wherein the anion receptor has Formula IIA or BB:

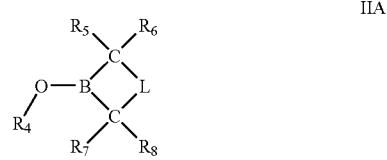

-continued

IIB wherein

R$_5$, R$_6$, R$_7$, and R$_8$ are independently halogen, alkyl, aryl, haloalkyl, or haloaryl;

L is a C$_{1-6}$ alkylene group, optionally substituted with one or more halogens; and L' is a C$_{1-5}$ alkylene group, optionally substituted with one or more halogens.

8. The electrolyte of claim 7, wherein L is a C$_{2-3}$ alkylene group optionally substituted with one or more halogens, and L' is a C$_{1-2}$ alkylene group, optionally substituted with one or more halogens.

9. The electrolyte of claim 3, wherein the anion receptor has Formula III:

III

10. The electrolyte of claim 9, wherein the anion receptor has the Formula IIIA or IIIB:

IIIA

IIIB wherein

R$_5$, R$_6$, R$_7$, and R$_8$ are independently halogen, alkyl, aryl, haloalkyl, or haloaryl;

L' is a C$_{1-5}$ alkylene group, optionally substituted with one or more halogens; and L" is a C$_{1-3}$ alkylene group, optionally substituted with one or more halogens.

11. The electrolyte of claim 3, wherein the anion receptor has Formula IV:

IV

12. The electrolyte of claim 11, wherein the anion receptor has Formula IVA:

IVA wherein

R$_5$, R$_6$, R$_7$, and R$_8$ are independently halogen, alkyl, aryl, haloalkyl, or haloaryl; and L" is absent or is a C$_{1-3}$ alkylene group, optionally substituted with one or more halogens.

13. The electrolyte of claim 12, wherein L" is absent or is a methylene group, optionally substituted with one or more halogens.

14. The electrolyte of claim 3, wherein the anion receptor has Formula VA or VB:

VA

VB wherein R$_9$, R$_{10}$, R$_{11}$, and R$_{12}$ are hydrogen, halogen, alkyl, aryl, haloalkyl, haloaryl.

15. The electrolyte of claim 3, wherein the additive is selected from the group consisting of tris(1,1,1,3,3,3-hexafluoro-propan-2-yl)borate, tris(1,1,1,3,3,3-hexafluoro-2-phenyl-propan-2-yl)borate, tris(1,1,1,3,3,3-hexafluoro-2-(trifluoromethyl)propan-2-yl)borate, triphenylborate, tris(4-fluorophenyl)borate, tris(2,4-difluorophenyl)borate, tris(2,3,5,6-tetrafluorophenyl)borate, tris(pentafluorophenyl)borate, tris(3-(trifluoromethyl)phenyl)borate, tris(3,5-bis(trifluoromethyl)phenyl)borate, tris(pentafluorophenyl)borane, 2-(2,4-difluorophenyl)-4-fluoro-1,3,2-benzodioxaborole, 2-(3-trifluoromethylphenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl)phenyl-tetrafluoro-1,3,2-benzodioxaborole, 2,5-bis(trifluoromethyl)phenyl-tetrafluoro-1,3,2-benzodioxaborole, 2-phenyl-4,4,5,5-tetrakis(trifluoromethyl)-1,3,2-benzodioxaborolane, 2-(3,5-difluorophenyl)-4,4,5,5-tetrakis(trifluoromethyl)-1,3,2-dioxaborolane, 2-pentafluorophenyl-4,4,5,5-tetrakis-(trifluoromethyl)-1,3,2-dioxaborolane, bis(1,1,1,3,3,3-hexafluoroisopropyl)phenylboronate, bis(1,1,1,3,3,3-hexafluoroisopropyl)-3,5-difluorophenylboronate, bis(1,1,1,3,3,3-hexafluoro-isopropyl)(pentafluorophenyl)boronate, and a mixture of any two or more thereof.

16. The electrolyte of claim 1, wherein the lithium salt is $LiClO_4$, $LiBF_4$, $LiAsF_6$, $LiPF_6$, $LiCF_3SO_3$, $Li[N(CF_3SO_2)_2]$, $Li[C(CF_3SO_2)_3]$, $Li[N(SO_2C_2F_5)_2]$, lithium alkyl fluorophosphates, or a mixture of any two or more thereof.

17. The electrolyte of claim 1, wherein the polar aprotic solvent is ethyl acetate, propyl acetate, ethylene carbonate, propylene carbonate, dimethyl carbonate, diethyl carbonate, ethyl methyl carbonate, diethyl ether, methyl acetate, gamma-butyrolactone, sulfolane, or a mixture of any two or more thereof.

18. The electrolyte of claim 1, further comprising a further electrode stabilizing additive that can be decomposed on the surface of a negative electrode to form a passivation film on the surface of negative electrode.

19. The electrolyte of claim 1, further comprising a further electrode stabilizing additive that can be decomposed on the surface of positive electrode to form a passivation film on the surface of the positive electrode.

20. The electrolyte of claim 1, further comprising a further electrode stabilizing additive selected from 1,2-divinyl furoate, 1-vinylazetidin-2-one, 1-vinylaziridin-2-one, 1-vinylpiperidin-2-one, 1-vinylpyrrolidin-2-one, 2,4-divinyl-1,3-dioxane, 2-amino-4-vinylcyclobutanone, 1,3-dimethyl butadiene, 2-amino-5-vinylcyclopentanone, 2-vinyl-aminocyclopropanone, 2-vinyloxy-cyclopropanone, 3-(N-vinylamino)-cyclohexanone, 3,5-divinyl furoate, 3-vinylazetidin-2-one, 3-vinylpyrrolidin-2-one, 4,4-divinyl-3-dioxolan-2-one, 5-vinylpiperidin-3-one, allylglycidyl ether, butadiene, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methyl phosphate, oxetan-2-yl-vinylamine, oxiranylvinylamine, piperidine, triethanolamine, trivinylphosphate, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl piperidine, vinyl-2-furoate, vinylcylopropanone, vinylethylene oxide, β-vinyl-γ-butyrolactone, alkyloxy, alkenyloxy, aryloxy, methoxy, allyloxy groups, 2-amino-3-vinylcyclohexanone, 2-vinylaminocyclohexanol, 2-vinyloxetane, 2-vinyl-[1,2]oxazetidine, 3-vinylcyclobutanone, 3-vinylcyclopentanone, 3-vinyloxaziridine, 3-vinyloxetane, 1,3-butadiene carbonate, 4-vinyltetrahydropyran, 2-amino-3-vinylcyclopropanone, 3-vinylaziridin-2-one, (divinyl)(methoxy)(trifluoro)cyclotriphosphazene compounds, (trivinyl)(difluoro)(methoxy)-cyclotriphosphazene compounds, (vinyl)(methoxy)(tetrafluoro)cyclotriphosphazene compounds, (aryloxy)(tetrafluoro)(methoxy)cyclotriphosphazene compounds, (diaryloxy)(trifluoro)-(methoxy)cyclotriphosphazene compounds, 1,2-diphenyl ether, 1,2-diphenylethane, 1-divinylimidazole, 2,4-dimethyl-6-hydroxy-pyrimidine, 2,4-divinyl isooxazole, 2-arylcyclopropanone, 2-aryloxycyclopropanone, 2-diaryloxy-furoate, 3,4-divinyl-1-methyl pyrrole, 3-vinyltetrahydrofuran, 4-allylanisole, allylanisole, aryloxy-pyrrole, aryloxy ethylene sulfate, aryloxy-2-furoate, aryloxy-carbazole, aryloxy-crotonate, aryloxy-cyclobutane, aryloxy-cyclopentanone, aryloxy-cyclophosphazene, aryloxy-cyclopropanone, aryloxy-ethyl-2-furoate, aryloxy-ethylene silicate, aryloxy-ethylene sulfate, aryloxy-ethylene sulfite, aryloxy-imidazole, aryloxy-methacrylate, aryloxy-o-terphenyl, aryloxyoxetane, aryloxy-phenyl carbonate, aryloxy-phosphate, aryloxy-piperidine, aryloxypyrazine, aryloxypyridazine, aryloxy-pyrrole, aryloxy-quinoline, aryloxy-tetrahydrofuran, biphenyl, butyl-aryloxy-ether, diaryloxy ethylene carbonate, diaryloxy furan, diaryloxy methyl phosphate, diaryloxy-butyl carbonate, diaryloxy-crotonate, diaryloxy-cyclotriphosphazene, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl diphenyl ether, divinyl furan, divinyl methoxy furan, divinyl methoxybipyridine, divinyl methoxydiphenyl ether, divinyl phenyl carbonate, divinylpyrazine, imidazole, indole, isoquinoline, methoxy-4-vinylbiphenyl, methoxycarbazole, methoxy-o-terphenyl, naphthalene, N-methyl pyrrole, o-terphenyl, pyrazine, pyridazine, pyridine, pyrimidine, quinoline, quinoxaline, (tetrahydro-furan-2-yl)-vinylamine, vinyl imidazole, vinyl indole, vinyl isoquinoline, vinyl methoxy carbazole, vinyl methoxy imidazole, vinyl methoxy piperidine, vinyl methoxypyrazine, vinyl methoxyquinoline, vinyl methyl carbonate, vinyl pyrazine, vinyl pyridazine, vinyl pyridazine, vinyl pyridine, vinyl pyrimidine, vinyl quinoline, vinyl quinoxaline, vinylmethoxy pyrrole, vinyl-tetrahydrofuran, 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof.

21. The electrolyte of claim 1, further comprising a further electrode stabilizing additive that is a substituted or unsubstituted spirocyclic hydrocarbon containing at least one oxygen atom and at least one alkenyl or alkynyl group, wherein the electrode stabilizing additive has Formula VI:

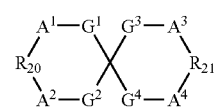

VI wherein
$A^1$, $A^2$, $A^3$, and $A^4$ are independently O or $CR_{22}R_{23}$; provided that $A^1$ is not O when G' is O, $A^2$ is not O when $G^2$ is O, $A^3$ is not O when $G^3$ is O, and $A^4$ is not O when $G^4$ is O;
$G^1$, $G^3$, and $G^4$ are independently O or $CR_{22}R_{23}$; provided that $G^1$ is not O when $A^1$ is O, $G^2$ is not O when $A^2$ is O, $G^3$ is not O when $A^3$ is O, and $G^4$ is not O when $A^4$ is O;

$R_{20}$ and $R_{21}$ are independently a substituted or unsubstituted divalent alkenyl or alkynyl group;

$R_{22}$ and $R_{23}$ at each occurrence are independently H, F, Cl, Br, or a substituted or an unsubstituted alkyl, alkenyl, or alkynyl group.

22. The electrolyte of claim 21, wherein the further electrode stabilizing additive is 3,9-divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9-diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9-dimethylene-1,5,7,11-tetraoxaspiro[5.5]undecane, 3,9-diethylidene-1,5,7,11-tetraoxaspiro[5.5]undecane, or a mixture of any two or more thereof.

23. The electrolyte of claim 19, wherein the further electrode stabilizing additive is present at a concentration of about 0.001 to about 8 wt %.

24. An electrochemical device comprising:
a cathode
an anode; and
an electrolyte of claim 1.

* * * * *

UNITED STATES PATENT AND TRADEMARK OFFICE
CERTIFICATE OF CORRECTION

| | |
|---|---|
| PATENT NO. | : 9,184,428 B2 |
| APPLICATION NO. | : 11/373054 |
| DATED | : November 10, 2015 |
| INVENTOR(S) | : Chen et al. |

It is certified that error appears in the above-identified patent and that said Letters Patent is hereby corrected as shown below:

Claims

In Claim 7, Column 16, Line 58, delete "BB:" and insert --IIB:--.

In Claim 21, Column 20, Line 65, delete "$G^1$, $G^3$, and $G^4$" and insert --$G^1$, $G^2$, $G^3$, and $G^4$--.

Signed and Sealed this
First Day of March, 2016

Michelle K. Lee
*Director of the United States Patent and Trademark Office*